United States Patent Office 3,179,522
Patented Apr. 20, 1965

3,179,522
ORGANIC PHOSPHORUS ESTERS AND POLYESTERS
Samuel C. Temin, Pittsburgh, Pa., assignor to Koppers Company, Inc., a corporation of Delaware
No Drawing. Filed Aug. 13, 1962, Ser. No. 216,295
6 Claims. (Cl. 106—15)

This application is a continuation-in-part of my copending application Ser. No. 188,559, filed April 18, 1962, now U.S. Patent 3,065,183. This invention relates to water-soluble organic compounds of pentavalent phosphorus. In one specific aspect, it relates to a novel flame retardant cellulosic composition containing a water-soluble organic phosphorus compound.

I have found that the water-soluble phosphorus esters and polyesters described in my copending application make excellent flame retardants for cellulosic material, such as paper, cotton fabric, and wood. Paper impregnated with the novel water-soluble phosphorus polyesters failed to support combustion when a match was applied to it.

It is an object of the present invention to provide a water-soluble, flame retardant organic phosphorus compound which can be bound chemically to the substrate. Another object of the invention is to provide a novel flame retardant cellulosic composition containing a water-soluble organic phosphorus compound.

In accordance with my invention, I have discovered a novel flame retardant cellulosic composition comprising cellulosic material impregnated with water-soluble pentavalent phosphorus diesters having the formula:

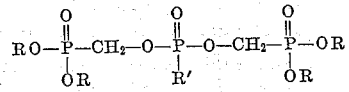

wherein R is a member selected from the group consisting of hydrogen and lower alkyl and R' is a member selected from the group consisting of lower alkyl, halo lower alkyl, cycloalkyl of 5–6 carbon atoms, phenyl, halophenyl, alkaryl of up to 8 carbon atoms and aralkyl of up to 8 carbon atoms whereby from 1–20 percent of the diester is retained by the cellulosic material. The new diesters are made as described in the aforementioned U.S. Patent 3,065,183, by reacting at a temperature of 25–150° C. a phosphonic acid of the formula:

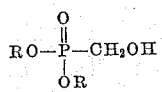

wherein R is as defined above, with a compound of the formula:

wherein R' is as defined above and X is halogen.

I have also discovered a novel flame retardant cellulosic composition comprising cellulosic material impregnated with a water-soluble poly(phosphonate-phosphinate) of the formula:

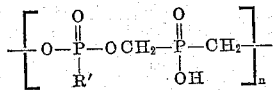

wherein R' is a member selected from the group consisting of cycloalkyl of 5–6 carbon atoms, lower alkyl, halo lower alkyl, phenyl, halophenyl, alkaryl of up to 8 carbon atoms and aralkyl of up to 8 carbon atoms and $n$ is an integer having a value of at least three whereby from 1–20 percent of the polymer is retained by the cellulosic material. The method of making this polymer comprises reacting at a temperature of 25–150° C. a phosphonic acid of the formula:

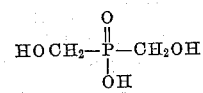

with a phosphonic dihalide of the formula:

wherein R' is as defined above and X is halogen.

For preparing the diesters useful phosphonic acids include hydroxymethylphosphonic acid, dimethyl hydroxymethylphosphonate, diethyl hydroxymethylphosphonate, and monomethyl hydroxymethylphosphonate.

Useful phosphonic dihalides are those of the formula:

including methylphosphonic dichloride, ethylphosphonic dibromide, isopropylphosphonic diiodide, butylphosphonic difluoride, cyclohexylphosphonic dichloride, chloromethylphosphonic dichloride, bromomethylphosphonic dibromide, phenylphosphonic dichloride, p-chlorophenylphosphonic dichloride, 2,4-dichlorophenylphosphonic dichloride, p-bromophenylphosphonic dibromide, trichloromethylphosphonic dichloride, p-tolylphosphonic dichloride, 2,4 - dimethylphenylphosphonic dichloride, nitromethylphosphonic dichloride, p-nitrophenylphosphonic dichloride, p-methoxyphenylphosphonic dichloride, p-chlorobenzylphosphonic dichloride, 2 - chloro-4-bromophenylphosphonic dichloride, benzylphosphonic dichloride, 2-methoxyethylphosphonic dichloride and 4-ethoxybutylphosphonic dichloride.

The temperature at which the diesters are prepared is between 20° to 200° C. At temperatures below 20° C. the reaction takes place too slowly, whereas at temperatures much above 200° C., decomposition may occur. The preferred temperature range is between 60° C. to 120° C. whereby the reaction proceeds at a reasonable rate.

The reaction may be conducted at atmospheric pressure, although reduced pressures are desirable to facilitate removal of the volatile by-product, hydrogen chloride. The reduced pressure used should be such that neither of the reactants is volatile at the temperature used. Thus, if phenylphosphonic dihalide is used and a corresponding reaction temperature of about 110° C. maintained, then the pressure should not be below about 30 mm. Hg during the first part of the reaction.

Generally the reaction takes place readily in the absence of an inert diluent or catlayst. However, catalysts, diluents or solvents may be employed. If a solvent is used, it is necessary that the product be separated from the solvent, usually by volatilization of the solvent.

The phosphonate diesters are usually characterized by solubility in water and methanol and insolubility in benzene, gasoline, carbon tetrachloride and other oil solvents. The diesters are further characterized by high viscosity at room temperature with no tendency to crystallize.

For preparing the polymers, bis(hydroxymethyl)phosphinic acid is used in conjunction with the phosphonic dihalide as previously defined. Homologues in which the hydroxymethyl groups (i.e. —$CH_2OH$) are replaced by higher hydroxy alkyl groups (i.e. —CHROH) have not produced the novel water-soluble polymers.

Polymerization to form the phosphonate-phosphinate occurs under the same conditions of temperature and pressure as given above in the preparation of the diesters. The chain length of the polyphosphonate-phosphinate is determined by the stoichiometry or molar ratios of the reactants. Higher molecular weight products are obtained by avoiding excess of either reactant and carefully purifying these same reactants. Further, higher molecular weights are formed by the use of lower subatmospheric pressures during the reaction. The degree of polymerization represented by the symbol "$n$," has a minimum value of 3 and a maximum value of about 100. By controlling the value of "$n$," a polymer having a molecular weight of over 550 to about 25,000 may be obtained. The polymer thus produced is generally characterized by the properties of solubility in water and polar solvents, insolubility in hydrocarbons, high viscosity at room temperature and no tendency to crystallize at room temperature.

My invention is further illustrated by the following examples:

EXAMPLE I

Bis(phosphonomethyl)chloromethyl phosphonate

To a three-neck flask, fitted with a mechanical stirrer, dropping funnel and outlet tube, was added 112 g. of hydroxymethylphosphonic acid. The flask was heated by means of an oil bath maintained at 110° and, under continuous stirring, 84 g. of chloromethylphosphonic dichloride were gradually added from the dropping funnel. During the reaction, hydrogen chloride gas was evolved. After two hours, the outlet tube was connected to a vacuum source and the melt was heated to about 110° C. and under a reduced pressure (20 mm. of mercury) for an additional two hours. The yield of bis(phosphonomethyl)chloromethylphosphonate obtained was 159 g. The product was a viscous liquid, $n_D^{22.5}$, 1.5050. Elemental analyses were as follows:

| Element | Found (percent) | Calc'd for $C_3H_{10}O_9P_3Cl$ (percent) |
|---|---|---|
| C | 11.3 | 11.3 |
| H | 3.3 | 3.1 |
| P | 29.6 | 29.2 |

EXAMPLE II

Bis(phosphonomethyl)phenylphosphonate

In an apparatus similar to that described in Example I, 81 g. of hydroxymethylphosphonic acid was heated and stirred at 115° C. and at a pressure of 30 mm., while 73.5 g. of phenylphosphonic dichlorides were added over a period of two hours. The product, 128 g. was a colorless syrup which barely flowed at room temperature. Elemental analyses were as follows:

| Element | Found (percent) | Calc'd for $C_8H_{13}P_3O_9$ (percent) |
|---|---|---|
| C | 28.3 | 27.8 |
| H | 3.9 | 3.8 |
| P | 27.7 | 26.9 |

The infrared spectrum was consistent with that of the triphosphonate compound.

EXAMPLE III

Bis(diethylphosphonomethyl)phenylphosphonate

To 19.4 g. of diethyl hydroxymethylphosphonate, $HOCH_2$—$P(O)(OC_2H_5)_2$, prepared from the reaction of formaldehyde with diethyl hydrogen phosphite, was added 11.3 g. of phenylphosphonic dichloride over a period of 30 minutes. The temperature of the reaction was maintained at about 60° C. The mixture was stirred while gaseous hydrogen chloride was evolved. After two hours, the vessel containing the reaction mixture was connected to a vacuum source and a pressure of 20 mm. maintained for two hours. The product was then subjected to a temperature of 100° C. and a pressure of 1 mm. for one hour to remove volatiles. The clear, viscous liquid product remaining (25 g.) gave an elemental analysis conforming to the calculated value for $C_{16}H_{29}O_9P_3$. The ester was soluble in methanol and water and insoluble in ether and benzene.

EXAMPLE IV

Poly[phosphinico bis(methyl)]phenylphosphonate

In an apparatus similar to that described in Example I, 50.4 g. of bis(hydroxymethyl)phosphinic acid was heated to a temperature of 100° C. To the acid was added, with stirring, over a period of one hour, 78.0 g. of phenylphosphonic dichloride. The temperature was then raised to 150° C. and the pressure reduced to 20 mm. After three hours, a slightly amber, viscous liquid was obtained which on cooling became a stiff semi-solid material. The yield was 95 g. Infrared analysis corresponded to a polymer with the structure:

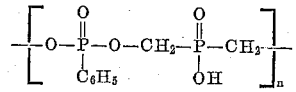

The fluid had $n_D^{22}$, 1.530. It analyzed 24.6% phosphorus compared with a calculated value of 25.0%.

EXAMPLE V

Poly[phosphonico bis(methyl)]chloromethylphosphonate

To 64.4 g. of bis(hydroxymethyl)phosphinic acid, maintained at 110° C., was gradually added 84.4 g. of chloromethylphosphonic dichloride. The mixture was stirred thoroughly. After two hours at atmospheric pressure, the reaction vessel was connected to a vacuum source and the heating and stirring continued at 20 mm. pressure for two additional hours. The temperature was then raised to 150° C. and the pressure lowered to 1 mm. After one hour there was obtained 130 g. of a colorless viscous polymer, $n_D^{23}$, 1.5029. Infrared analysis confirmed the structure as a polymer of the formula:

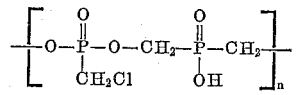

The polymer contains, by elemental analysis, 27.7% phosphorus, which corresponds to the calculated value of 28.1% for $C_3H_7O_5P_2Cl$.

EXAMPLE VI

Use of bis(phosphonomethyl)chloromethylphosphonate as a flame retardant. A 10% aqueous treating solution was prepared containing 166 g. bis(phosphonomethyl)chloromethylphosphonate, 30 g. triethanolamine, 95 g. melamine-formaldehyde resin, 100 g. urea, and 610 g. water. The solution was applied to cotton fabric which was dried and cured for 4.5 minutes at 280° F. Then the fabric was rinsed, washed, and dried. Tests of the treated fabric showed that it exhibited good flame retardancy and that the flame retardancy was not destroyed by repeated washings.

EXAMPLE VII

*The effect on fire-resistance imparted to wood*

A 15% aqueous solution of bis(phosphonomethyl)chloromethylphosphonate was applied to Southern yellow pine. The percent retention of the triphosphonate, based on the oven dried weight of the wood, was 20%. Using the conventional fire tube apparatus (ASTM E69–50) the percent weight loss on burning was found to be 22%. In a similar test with poly[phosphinico bis(methyl)]chloromethylphosphonate the weight retention was again 20% and the percent weight loss (ASTM E69–50) was only 18%. A value of only 18% weight loss approaches a fire retardant classification of "excellent."

EXAMPLE VIII

*The effect on fire resistance imparted to cotton fabric*

In a manner similar to that described in Example I, 112 g. of hydroxymethylphosphonic acid was allowed to react with 100 g. of cyclohexylphosphonic dichloride. The clear, viscous fluid obtained gave an elemental analysis conforming to the calculated values for $C_8H_{19}O_9P_3$. An aqueous solution of this ester was padded onto a cotton fabric in a manner similar to the process described in Example VI. The cloth exhibited good flame retardancy which was retained after several washings.

EXAMPLE IX

*The effect on fire resistance imparted to paper*

From the reaction of formaldehyde with dimethyl hydrogen phosphite was obtained dimethyl hydroxymethylphosphonate, $HO—CH_2—P(O)(OCH_3)_2$. To 24.8 g. of this compound was added 11.5 g. of p-chlorophenylphosphonic dichloride over a period of 30 minutes. The stirred reaction mixture was maintained at 65–70° C. while gaseous hydrogen chloride was evolved. After about 150 minutes, the pressure in the reaction vessel was reduced to 10 mm. This pressure and a temperature of 85–90° C. was maintained for two hours. The clear viscous product remaining gave an elemental analysis conforming to the calculated values for $C_{12}H_{20}O_9P_3Cl$. A piece of filter paper impregnated with 10% (of its original weight) of this product no longer supported combustion after removal from the flame of a Bunsen burner.

EXAMPLE X

*The effect on fire resistance imparted to paper*

A weighted sheet of filter paper was treated with a 10% methanolic solution of poly[phosphinico bis(methyl)]phenylphosphonate and then oven dried. The increase in weight showed that the retention of polymer was 11% based on the original weight of the paper.

The paper no longer supported combustion when a match was applied to it. Similarly the paper was held in the flame of a Bunsen burner and, on removal, the flame was self-extinguishing.

This example and the prior example show the excellent flame retardance imparted to cellulosic material. The foregoing results are obtained when the cellulosic material is impregnated with from one to twenty percent of the organic phosphorus compounds of the present invention.

EXAMPLE XI

*The effect on fire resistance imparted to cotton fabric*

A sample of poly[phosphinicobis(methyl)]isopropylphosphonate, prepared by the reaction of equimolar amounts of isopropyl phosphonic dichloride and bis(hydroxymethyl)phosphinic acid, was dissolved in methanol to form a 10% solution. A sample of 6 oz. cotton twill was immersed in this solution, then passed between rollers and dried. The gain in weight corresponded to an 8% increase based on the dry weight of the cloth. The cloth became flame resistant and did not support combustion.

A sample held in the flame of a Bunsen burner blackened but did not continue to burn when removed from the flame.

EXAMPLE XII

*The effect on fire resistance imparted to wood*

By reaction of p-tolylphosphonic dichloride and bis(hydroxymethyl)phosphinic acid, according to the general procedure of Example IV, the viscous, colorless [phosphinicobis(methyl)]p-tolylphosphonate was obtained. This polymer was applied to Southern yellow pine as a 15% aqueous solution so that a 20% retention based on the oven dried weight of the wood, was obtained. Using the procedure of ASTM E69–50, the percent weight loss of the wood on burning was found to be 19%.

EXAMPLE XIII

*The effect on fire resistance imparted to wood*

The reaction of p-bromophenylphosphonic dibromide and bis(hydroxymethyl)phosphinic acid, according to the procedure used in Example IV, yielded poly[phosphinicobis(methyl)]bromophenylphosphonate. A 10% aqueous solution of this polymer was prepared and a wooden splint (pine) immersed in the solution for one hour. The splint was then dried in an oven at 110° C. for three hours. The gain in weight corresponded to a 10% increase based on the weight of the dry wood. When held in the flame of a Bunsen burner the splint blackened, but did not continue to burn when removed from the flame.

I claim:

1. A method of making a flame retardant cellulosic composition comprising impregnating a cellulosic material with an organic water-soluble poly(phosphonate-phosphinate) compound of the formula:

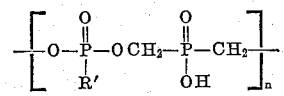

wherein R' is a member selected from the group consisting of lower alkyl, halo lower alkyl, cycloalkyl of 5–6 carbon atoms, phenyl, halophenyl, alkaryl of up to 8 carbon atoms, and aralkyl of up to 8 carbon atoms, and n is an integer having a value of at least 3, whereby from 1–20 percent of said compound is retained by said cellulosic material.

2. A method of making a flame retardant cellulosic composition comprising impregnating a cellulosic material with an aqueous solution containing 1–20 percent by weight of an organic water-soluble poly(phosphonate-phosphinate) compound of the formula:

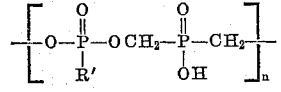

wherein R' is a member selected from the group consisting of lower alkyl, halo lower alkyl, cycloalkyl of 5–6 carbon atoms, phenyl, halo phenyl, alkaryl of up to 8 carbon atoms, and aralkyl of up to 8 carbon atoms, and n is an integer having a value of at least 3.

3. A flame retardant cellulosic composition comprising 80–99 percent by weight of a cellulosic material impregnated with 1–20 percent by weight of an organic water-soluble poly(phosphonate-phosphinate) compound of the formula:

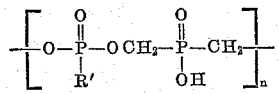

wherein R' is a member selected from the group consisting of lower alkyl, halo lower alkyl, cycloalkyl of 5–6 carbon atoms, phenyl, halo phenyl, alkaryl of up to 8 carbon atoms, and aralkyl of up to 8 carbon atoms, and $n$ is an integer having a value of at least 3.

4. A composition according to claim 3 wherein said cellulosic material is paper and said organic water-soluble poly(phosphonate-phosphinate) compound is poly[phosphinicobis(methyl)]phenylphosphonate.

5. A composition according to claim 3 wherein said cellulosic material is cotton fabric and said organic water-soluble poly(phosphonate-phosphinate) compound is poly[phosphinicobis(methyl)]isopropylphosphonate.

6. A composition according to claim 3 wherein said cellulosic material is wood and said organic water-soluble poly(phosphonate-phosphinate) compound is poly[phosphinicobis(methyl)]phenylphosphonate.

References Cited by the Examiner
UNITED STATES PATENTS

| | | | |
|---|---|---|---|
| 1,388,825 | 8/21 | Arent | 106—15 |
| 2,048,293 | 7/36 | Richter et al. | 106—15 |
| 2,807,636 | 9/57 | Buls et al. | 260—461.303 |
| 3,042,701 | 7/62 | Birum | 252—8.1 XR |
| 3,042,702 | 7/62 | Birum | 106—15 XR |

ALEXANDER H. BRODMERKEL, *Primary Examiner.*